United States Patent [19]

Weirich et al.

[11] 4,247,135
[45] Jan. 27, 1981

[54] HYDRAULIC COUPLING DEVICE

[75] Inventors: Walter Weirich, Dortmund; Bernd Peters, Dulmen, both of Fed. Rep. of Germany

[73] Assignee: Gewerkschaft Eisenhütte Westfalia, Fed. Rep. of Germany

[21] Appl. No.: 867,044

[22] Filed: Jan. 5, 1978

[30] Foreign Application Priority Data

Jan. 13, 1977 [DE] Fed. Rep. of Germany ....... 2701212

[51] Int. Cl.³ .............................................. F16L 39/00
[52] U.S. Cl. ................................ 285/137 R; 285/305; 285/354; 285/387
[58] Field of Search .................... 285/137 R, 387, 388, 285/354, 305

[56] References Cited

U.S. PATENT DOCUMENTS

| 626,447 | 6/1899 | Strater | 285/137 R |
|---|---|---|---|
| 2,597,482 | 5/1952 | Harrison et al. | 285/305 |
| 3,214,195 | 10/1965 | Zahuranec | 285/137 R |
| 3,305,249 | 2/1967 | Zahuranec | 285/137 R |
| 3,590,855 | 7/1971 | Clayton et al. | 285/137 R |
| 3,767,234 | 10/1973 | Weirich | 285/137 R |
| 3,768,844 | 10/1973 | Goward | 285/137 R |

FOREIGN PATENT DOCUMENTS

| 302078 | 11/1917 | Fed. Rep. of Germany | 285/137 R |
| 992097 | 7/1951 | France | 285/388 |

Primary Examiner—Dave W. Arola
Attorney, Agent, or Firm—Charles E. Pfund

[57] ABSTRACT

A coupling device is provided for connection to a plurality of hydraulic conduits which are bunched together to form a multi-core duct. The coupling device has a casing which houses a plurality of plug pins, the plug pins each being connectible to a respective one of the conduits. A holder is provided for holding the plug pins, the holder being rotatably mounted in the casing. A connector, which is formed in two detachably interconnected parts, is also provided for connection to the coupling device.

7 Claims, 7 Drawing Figures

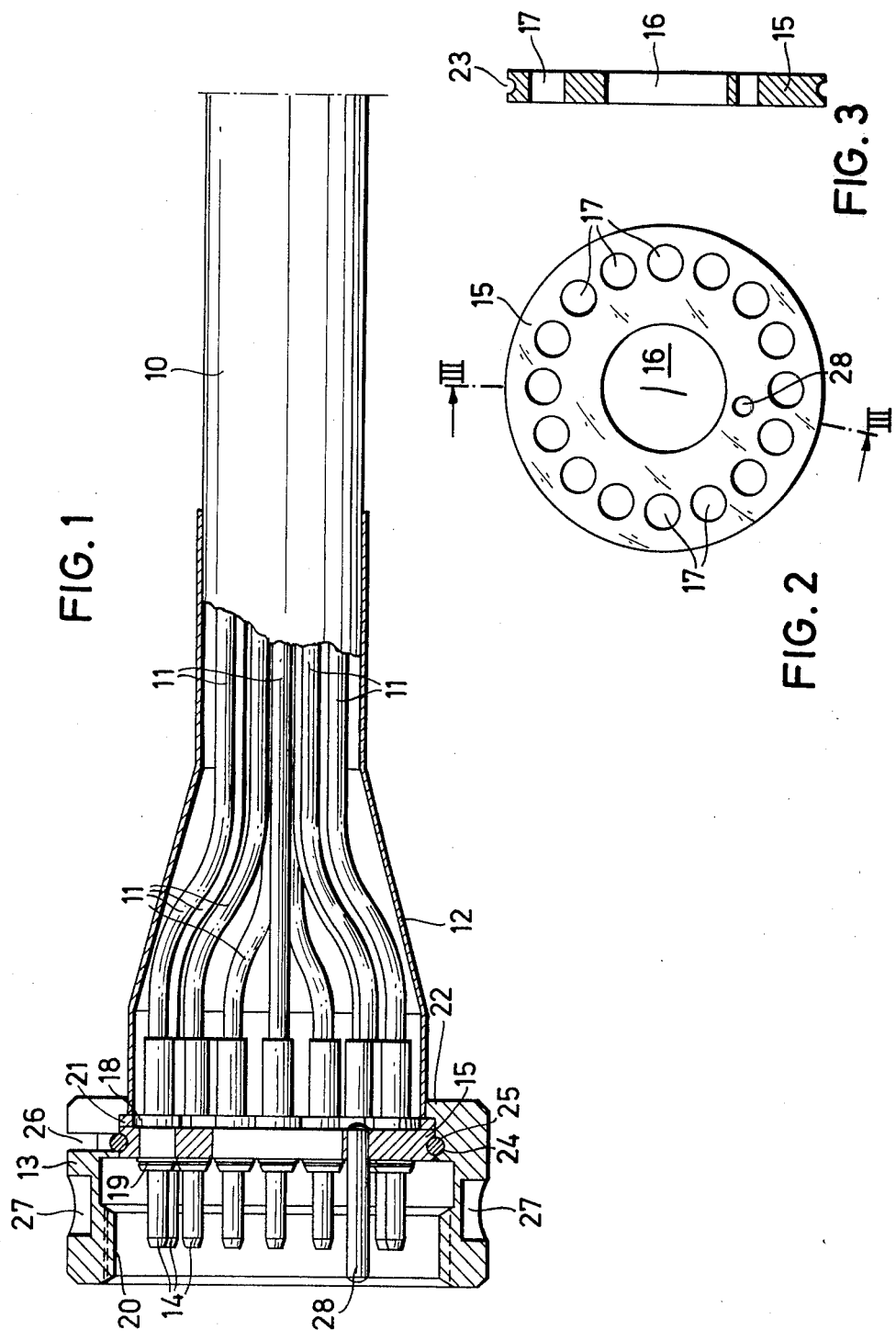

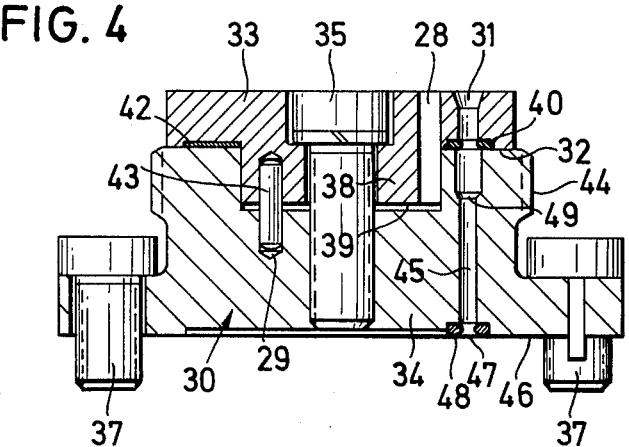
FIG. 4
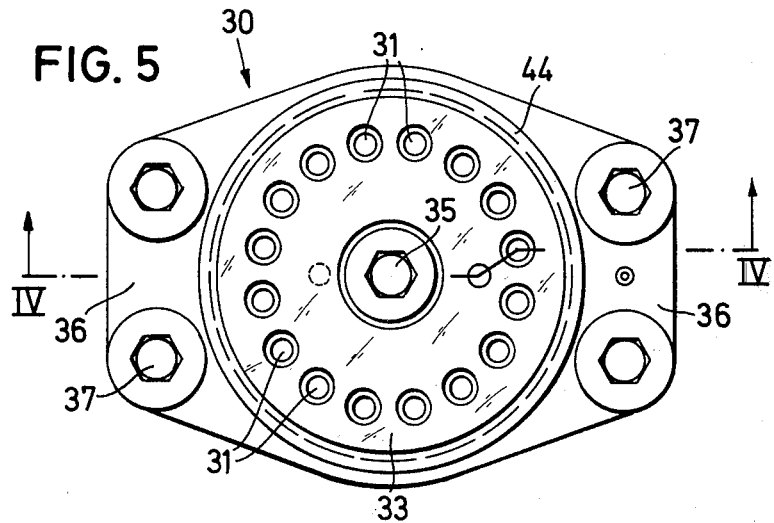
FIG. 5
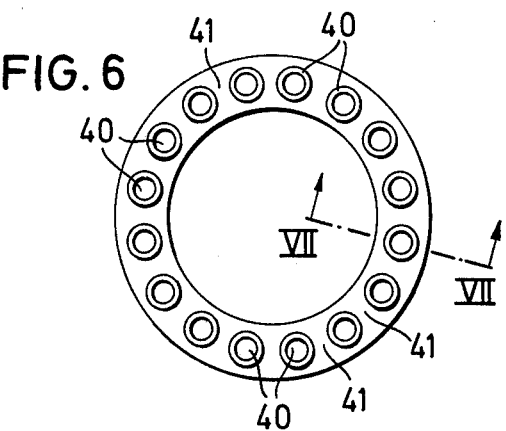
FIG. 6
FIG. 7

HYDRAULIC COUPLING DEVICE

BACKGROUND TO THE INVENTION

This invention relates to a coupling device for connection to a plurality of hydraulic conduits which are bunched together to form a multi-core duct. The invention is particularly useful in the hydraulic distribution systems used in mine workings.

In underground mine workings, such as longwall workings having hydraulically advanceable roof support assemblies and other hydraulic appliances, a number of high pressure hydraulic conduits have to be laid within, and pass along, the individual units of the roof support assembly. In the restricted spaces available in mines, however, the installation of the numerous conduits is greatly impeded, particularly as it has to be carried out in such a way that the roof support assembly, and the associated longwall conveyor, can be advanced without damaging these conduits.

Systems are known in which the numerous hydraulic conduits are bunched together to form multi-core hydraulic ducts, interconnected by means of generally cylindrical plug couplings. A known plug coupling of this type includes a coupling device having a plurality of plug pins fixed to the individual cores of the duct and held by means of circlips in apertures in the end face of the coupling device in such a way that they are rotatable and axially displaceable relative thereto. Thus, when the coupling is being put together, the plug pins can be introduced into plug apertures provided in the mating connector of the coupling. Such a coupling is fairly complicated and is relatively difficult to assemble as the coupling piece has to be screwed onto a piece of piping by means of a screw cap which in its turn is secured to the end of the duct by means of, for example, a pressure ring. When the coupling is being assembled, the coupling device is introduced into the connector, during which process the plug pins are inserted in the plug apertures, and the two parts of the coupling are interconnected by means of U-shaped spring clips which are introduced into grooves and recesses in the two coupling parts.

The main aim of the invention is to provide a plug coupling, and a coupling device therefor, which is simple and cheap to manufacture, whose installation and assembly is simple, and which is also easy to release.

SUMMARY OF THE INVENTION

The present invention provides a coupling device for connection to a plurality of hydraulic conduits which are bunched together to form a multi-core duct, the coupling device comprising a casing, a plurality of plug pins housed within the casing, the plug pins each being connectible to a respective one of the conduits, and a holder for holding the plug pins, wherein the holder is rotatably mounted in the casing.

Advantageously, the holder is constituted by a disc provided with a plurality of apertures, a respective plug pin being held in each of the apertures, and preferably the disc is annular and the apertures are equispaced on a common pitch circle thereof.

The casing may be provided with an internal recess which accommodates the disc, and a screw cap may constitute the casing.

Advantageously, the holder is mounted in the casing in such a manner as to be axially non-displaceable. Preferably, where the holder is a disc, the disc is provided with a groove in its peripheral edge and the casing is provided with a corresponding internal groove facing said groove in the disc edge, the two grooves defining an annular channel into which an elongate locking member can be inserted so as to prevent axial movement between the disc and the casing. This constitutes a simple way of connecting the plug pins to the holder disc. Conveniently the annular channel has a circular cross-section, a wire constitutes the elongate locking member, and the casing is provided with an externally open slot which merges with the internal groove in the casing so as to provide access for the insertion of the elongate locking member. As the casing and the disc are rotatable in relation to each other, it is possible for the casing (and the corresponding connector which in use is connected thereto) to be coupled together via a rotary connection. In this case, owing to the force transmission of the rotary connection, high closing forces can be obtained for the completion of the coupling and the plug pins can be pressed into apertures in the connector in the manner required. Even if the multi-core duct has a large number of conduits, this system enables sufficient axial force to be applied to press the plug pins into the corresponding apertures without too great a force having to be exerted.

Preferably, each plug pin is held by the disc by means of a collar which rests against the rear face of the disc and by a circlip which rests against the front face of the disc.

Advantageously, the coupling device further comprises a sleeve which, in use, is fitted over the end of the multi-core duct, the sleeve being formed with an outwardly directed flange which is clamped between the holder and an inwardly directed flange formed on the casing.

The invention further provides a coupling arrangement comprising a coupling device as defined above and a connector which is provided with a plurality of socket which, in use, mate with the plug pins of the coupling device.

Advantageously, the connector and coupling device are provided with complementary screw threads, and preferably, the casing of the coupling device is provided with an internal screw thread and the connector is provided with an external screw thread.

Preferably, the connector is formed in two detachably interconnected parts, the two parts meeting in a plane that lies transverse to the axial direction of the sockets and that passes through the sockets, and resilient sealing rings are provided between said two parts, each sealing ring constituting a seal between a respective plug pin and socket. Conveniently, the resilient sealing rings are all interconnected, by means of a thin webbing, to form a single annular sealing structure. As the resilient sealing rings are not situated on the plug pins but in the interior of the subdivided connector, the danger of contamination of, or mechanical damage to, the sealing ring is eliminated. The webbing preferably takes the form of flat crosspieces whose thickness is far smaller than that of the sealing rings which are shaped onto them and which may be profiled, for example, in the manner of O rings. As the individual sealing rings are interconnected to form a single structure, the operations of installing, removing and replacing these sealing devices are rendered far easier.

The two connector parts may be detachably interconnected by means of a screw-threaded member such as a bolt. Advantageously, one of the two connector parts is provided with at least one mounting flange for use in fastening the connector to another part of a hydraulic circuit. Preferably, each connector part is generally symmetrical about the central longitudinal axis of the connector.

Preferably, one of the connector parts has a central, axially-extending, alignment member which mates with a corresponding recess in the other connector part.

BRIEF DESCRIPTION OF THE DRAWINGS

The invention will now be described in greater detail by way of example, with reference to the accompanying drawings, in which:

FIG. 1 is a part-sectional side elevation of a multi-core duct with a coupling device constituted by a plurality of bunched hydraulic conduits;

FIG. 2 is a plan view of a holding disc of the coupling device of FIG. 1;

FIG. 3 is a cross-section taken on the line III—III of FIG. 2;

FIG. 4 is a cross-section taken on the line IV—IV of FIG. 5 of a connector for use with the coupling device of FIG. 1;

FIG. 5 is an end elevation of the connector of FIG. 4;

FIG. 6 is an end elevation of a sealing device for use with the plug coupling shown in FIGS. 1-5; and FIG. 7 is a cross-section taken on the line VII—VII of FIG. 6.

DESCRIPTION OF PREFERRED EMBODIMENTS

Referring to the drawings, FIG. 1 shows one end of a flexible hydraulic high-pressure, multi-core duct 10 which, in this case, has sixteen cores 11. The cores 11 are bunched together in a casing, made, for example, of a flexible plastics material. The casing of the multi-core duct 10 is removed from both its ends and one end of a metal sleeve 12, having a frusto-conical central portion, is force-fitted to the duct, the other end of the sleeve 12 being provided with a coupling device having a casing 13 and sixteen plug pins 14.

Each of the individual cores 11 is fitted, at its free end with one of the plug pins 14. The plug pins 14 are mounted in a holding disc 15 in such a way that the holding disc serves to secure and align the plug pins. As may be seen from FIGS. 2 and 3, the holding disc 15 takes the form of an annular disc provided with a central aperture 16, and sixteen circular recesses 17 situated on a common pitch circle, each recess 17 securing and aligning a respective one of the plug pins 14. The plug pins 14 are each a force-fit in the end of the corresponding core 11, and each plug pin passes through its recess 17 and has a collar 18 which rests against the rear side of the holding disc 15. The plug pins 14 are secured to the holding disc 15 by means of circlips 19 which snap into corresponding annular grooves of the plug pins. Each of the circlips 19 thus forms a detachable stop situated immediately in front of the front face of the holding disc 15.

The casing 13 of the coupling device takes the form of a screw cap, which is provided with a stepped cylindrical internal aperture and an internal screw-thread 20. The holding disc 15 is positioned in a correspondingly shaped recess in the base of the screw cap 13. The sleeve 12, which is fixed to the end of the duct 10, has an annular flange 21 which rests against a collar 22 of the screw cap 13. The holding disc 15 rests against the annular flange 21.

The screw cap 13 and the holding disc 15 are rotatable relative to one another but interconnected in an axially non-displaceable manner. As shown in FIGS. 1 and 3, the circular holding disc 15 has a peripheral groove 23 and the screw cap 13 is provided with a corresponding internal groove 24. These two grooves 23 and 24 form an annular channel into which a wire ring 25 or the like can be inserted from the outside. For this purpose, the screw cap 13 is provided with an outwardly facing recess 26 which extends into the base of the groove 24, and through which the wire 25 can be introduced in an approximately tangential direction into the annular channel. The wire 25 thus secures the screw cap 13 to the holding disc 15 on the flange end of the metal sleeve 12.

The screw cap 13 is provided with a number of equi-spaced recesses 27 into which the flanges of a turning tool, such as a mandrel, may be inserted when the coupling is being put together or released.

A centring pin 28 is secured to the holding disc 15, the centring pin being radially offset with respect of the recesses 17 and engaging a corresponding centring bore 29 provided in a connector 30 (see FIGS. 4 and 5) when the coupling is being put together.

The connector 30 is provided with sixteen sockets 31 which are equi-spaced on one common pitch circle whose diameter corresponds to the pitch circle diameter of the plug pins 14. The connector 30 is subdivided transversely by a plane 32 passing through the plug apertures 31. The two connector parts 33 and 34 thus formed are interconnected by means of a central bolt 35 which is screwed into a central threaded bore of the connector part 34, the screw head of the bolt occupying a countersunk position in the connector part 33. The connector part 34 is provided, on each of a pair of mutually opposite sides, with a mounting flange 36, screws 37 passing through these flanges to fix the connector 30 detachably to, for example, a valve block (not shown). The cylindrical connector part 33 is provided with a cylindrical centring member 38 which mates with a corresponding cylindrical centring aperture 39 in the connector part 34.

In order to seal the plug pins 14 inside the plug apertures 31 and also to seal the plug apertures between the two connector parts 33 and 34 on the dividing plane 32, use is made of sealing rings 40. The number of sealing rings 40 corresponds to the number of plug apertures 31 and thus to the number of plug pins 14. Each sealing ring 40 is made of a resilient material such as rubber or a plastics material. As may be seen from FIGS. 6 and 7, the sealing rings 40 are interconnected, to form one single annular structure, by means of narrow and flat intermediate webs 41. This annular sealing system is inserted in a flat annular recess 42 provided in the connector part 33, this annular recess 42 having a contour adapted to that of the annular sealing system. The individual sealing rings 40 are profiled in the manner of O-rings. They are pressed against the sealing surfaces by tightening up the screw 35 interconnecting the connector parts 33 and 34.

The two connector parts 33 and 34 of the connector 30 are centred in relation to each other by means of a centring pin 43. The connector part 34 is provided with an external thread 44 onto which the screw cap 13 can be screwed by its internal thread 20. The connector part 34 has bores 45 each of which forms a prolongation of one of the plug apertures 31, and each of which terminates in a flat surface 46 in an annular recess 47 which can also accommodate an annular sealing system 40,41 of the type described with reference to FIGS. 6 and 7. By means of the screws 37, the flat surface 46 of the connector 30 is clamped against a corresponding surface of the valve block (not shown), which is provided with corresponding connecting bores.

In the example illustrated, the holding disc 15 of the coupling device is provided with circular recesses 17 which engage with the plug pins 14. The circular recesses 17 can, however, be replaced by recesses of other cross-sections, for example, recesses which are open at the edge of the holding disc 15.

When the plug pins 14 are being connected to the holding disc 15, the wire 25 is not in position and the screw cap 13 is pushed back on the duct 10 so that the holding disc is exposed and made available for the connection of the plug pins. After the plug pins 14 have been connected, the screw cap 13 is pushed back along the duct 10 until the annular flange 21 encounters the holding disc 15, after which the wire 25 is pushed into the annular channel formed by the grooves 23 and 24 so as to connect the screw cap to the holding disc. When the coupling is being put together, the coupling device is mounted on the connector 30 in which process the plug pins 14 move into the plug apertures 31. The screw cap 13 is then turned by means of a turning tool, which is introduced into the recesses 27, as a result of which the screw-threaded connection between the screw cap and the holding disc 15 is effected, and the plug pins 14 are drawn further into the plug apertures 31. In the coupled condition the frustoconical ends of the plug pins 14 rest against correspondingly shaped surfaces 49 at the ends of the plug apertures 31.

We claim:

1. A coupling arrangement comprising a coupling device and a connector, the coupling device being constituted by a cylindrical casing, a plurality of plug pins housed within the casing, and a holder within said casing for holding the plug pins, and means for retaining said holder within said casing, and the connector being provided with a plurality of sockets which, in use, receive and mate with the plug pins of the coupling device, the plug pins each being connectible to a respective one of a plurality of high-pressure hydraulic conduits which are bunched together to form a multi-core duct, the connector being constituted by two detachably interconnected parts which meet in a plane that lies transversely to the axial direction of the sockets and that passes through the sockets axially spaced from the open ends of said sockets, resilient sealing rings located at said plane to constitute a seal between each respective plug pin and socket when the coupling arrangement is mated, and means for rigidly fastening said two detachably interconnected parts of said connector together which applies compression force to said sealing rings when said two parts are assembled, wherein said plug pins enter said sockets and pass through the compressed sealing rings when said coupling device and connector are mated to form said coupling arrangement without requiring application of axial force between said coupling device and connector to compress said sealing rings, and means to retain said coupling device and connector in mating engagement.

2. A connector according to claim 1, wherein the resilient sealing rings are all interconnected, by means of a thin webbing, to form a single annular sealing structure.

3. A connector according to claim 1, wherein the means for rigidly fastening the two detachably interconnected parts includes a screw-threaded member.

4. A coupling arrangement according to claim 1, wherein one of the two connector parts is provided with at least one mounting flange for use in fastening the connector to another part of a hydraulic circuit.

5. A coupling arrangement according to claim 4, wherein that part of the connector provided with said external screw thread is also provided with said at least one mounting flange.

6. A coupling arrangement according to claim 1, wherein each connector part is generally symmetrical about the central longitudinal axis of the connector.

7. A coupling arrangement according to claim 1, wherein one of the connector parts has a central, axially-extending, alignment member which mates with a corresponding recess in the other connector part.

* * * * *